US007793648B2

(12) United States Patent
Satou

(10) Patent No.: US 7,793,648 B2
(45) Date of Patent: Sep. 14, 2010

(54) HEATING COOKER

(75) Inventor: Chikashi Satou, Hyogo (JP)

(73) Assignee: Panasonic Corporation, Osaka (JP)

( * ) Notice: Subject to any disclaimer, the term of this patent is extended or adjusted under 35 U.S.C. 154(b) by 38 days.

(21) Appl. No.: 11/916,559

(22) PCT Filed: Oct. 10, 2006

(86) PCT No.: PCT/JP2006/320166

§ 371 (c)(1), (2), (4) Date: Dec. 5, 2007

(87) PCT Pub. No.: WO2007/043505

PCT Pub. Date: Apr. 19, 2007

(65) Prior Publication Data

US 2009/0032007 A1 Feb. 5, 2009

(30) Foreign Application Priority Data

Oct. 13, 2005 (JP) ............................ 2005-298633

(51) Int. Cl.

| | |
|---|---|
| ***F24C 7/04*** | (2006.01) |
| *F24C 7/08* | (2006.01) |
| *F24C 15/00* | (2006.01) |
| *A47J 27/00* | (2006.01) |
| *A47J 37/00* | (2006.01) |
| *G06F 3/02* | (2006.01) |
| *G06F 3/033* | (2006.01) |

(52) U.S. Cl. ................ 126/1 R; 126/39 BA; 126/39 G; 340/815.4; 340/815.53; 340/815.55; 345/48; 345/84; 362/85

(58) Field of Classification Search ................. 126/1 R, 126/39 BA, 39 G; 362/85; 340/815.4, 815.53, 340/815.55; 345/48, 84; *A47J 27/00, 37/00; F24C 7/04, F24C 7/08, 15/00; G06F 3/02, 3/033; H01H 13/02, H01H 13/52; H05B 3/00, 6/12*
See application file for complete search history.

(56) References Cited

U.S. PATENT DOCUMENTS 3,529,584 A * 9/1970 Celaya ..................... 126/39 N
3,923,037 A * 12/1975 Donato ..................... 126/39 C (Continued)

FOREIGN PATENT DOCUMENTS

JP 02115619 A * 4/1990

(Continued)

OTHER PUBLICATIONS

International Search Report for PCT/JP2006/320166 dated Jan. 16, 2007 .

*Primary Examiner*—Steven B McAllister
*Assistant Examiner*—Daniel E Namay
(74) *Attorney, Agent, or Firm*—RatnerPrestia

(57) ABSTRACT

A heating cooker includes a top panel for placing a load thereon and touch operation parts for allowing the user to operate the heating of the heater to heat the load. The operation display parts of the touch operation parts each include display characters disposed under the top panel and a backlight which emits light through the top panel so as to display the display characters in lighting. When not displayed, the operation display parts including the display characters are entirely unlit and made inoperable. This provides a user-friendly heating cooker.

5 Claims, 4 Drawing Sheets

U.S. PATENT DOCUMENTS

| | | | | | |
|---|---|---|---|---|---|
| 4,131,786 | A | * | 12/1978 | Cooper | 219/487 |
| 4,341,197 | A | * | 7/1982 | Butts | 126/39 BA |
| 4,430,541 | A | * | 2/1984 | Day, Jr. | 219/683 |
| 4,431,889 | A | * | 2/1984 | Saponara et al. | 219/683 |
| 4,454,501 | A | * | 6/1984 | Butts | 341/22 |
| 4,894,493 | A | * | 1/1990 | Smith et al. | 200/5 A |
| 4,930,488 | A | * | 6/1990 | Pearman et al. | 126/39 E |
| 5,310,110 | A | * | 5/1994 | Akamatsu et al. | 236/20 A |
| 5,349,162 | A | * | 9/1994 | Holling | 219/445.1 |
| 5,378,874 | A | * | 1/1995 | Holling et al. | 219/506 |
| 5,429,111 | A | * | 7/1995 | Akamatsu | 126/52 |
| 5,611,327 | A | * | 3/1997 | Filho et al. | 126/39 R |
| 5,999,136 | A | * | 12/1999 | Winter et al. | 343/713 |
| 6,198,080 | B1 | * | 3/2001 | Rice et al. | 219/506 |
| 6,279,170 | B1 | * | 8/2001 | Chu | 2/246 |
| 6,384,790 | B2 | * | 5/2002 | Dishart et al. | 343/713 |
| 6,680,614 | B2 | * | 1/2004 | Tekriwal et al. | 324/396 |
| 6,712,066 | B1 | * | 3/2004 | Atkinson et al. | 126/214 R |
| 6,830,045 | B2 | * | 12/2004 | Brock et al. | 126/19 R |
| 6,831,255 | B1 | * | 12/2004 | Levi et al. | 219/400 |
| 6,878,915 | B1 | * | 4/2005 | Hern-Fonseth et al. | 219/757 |
| 6,881,054 | B2 | * | 4/2005 | Levi et al. | 126/21 A |
| 6,895,953 | B2 | * | 5/2005 | Larsen et al. | 126/41 R |
| 6,903,318 | B2 | * | 6/2005 | Thorneywork | 219/702 |
| 6,943,324 | B2 | * | 9/2005 | Ahuja | 219/446.1 |
| 6,959,705 | B2 | * | 11/2005 | Briedis et al. | 126/193 |
| 7,022,949 | B2 | * | 4/2006 | Shukla | 219/483 |
| 7,117,937 | B2 | * | 10/2006 | Clark et al. | 165/206 |
| 7,370,649 | B2 | * | 5/2008 | Gama et al. | 126/39 BA |
| 2001/0005865 | A1 | * | 6/2001 | Byrnes et al. | 709/321 |
| 2001/0009128 | A1 | * | 7/2001 | Backus et al. | 99/421 H |
| 2001/0013841 | A1 | * | 8/2001 | Dishart et al. | 343/700 MS |
| 2001/0039460 | A1 | * | 11/2001 | Aisa | 700/17 |
| 2001/0042262 | A1 | * | 11/2001 | Chu | 2/246 |
| 2002/0053563 | A1 | * | 5/2002 | Pastore et al. | 219/448.11 |
| 2003/0198036 | A1 | * | 10/2003 | Nakamura | 362/24 |
| 2004/0069293 | A1 | * | 4/2004 | Steurer | 126/39 R |
| 2004/0108106 | A1 | * | 6/2004 | Clark et al. | 165/206 |
| 2004/0141110 | A1 | * | 7/2004 | Yu et al. | 349/110 |
| 2004/0222974 | A1 | * | 11/2004 | Hong et al. | 345/173 |
| 2005/0217661 | A1 | * | 10/2005 | Gama et al. | 126/211 |
| 2005/0235982 | A1 | * | 10/2005 | Gama et al. | 126/39 BA |
| 2005/0257785 | A1 | * | 11/2005 | Gama et al. | 126/39 BA |
| 2006/0016445 | A1 | * | 1/2006 | Cadima et al. | 126/39 BA |
| 2007/0125356 | A1 | * | 6/2007 | Crnkovich | 126/39 BA |
| 2008/0017046 | A1 | * | 1/2008 | Huber et al. | 99/325 |

FOREIGN PATENT DOCUMENTS

| | | | | |
|---|---|---|---|---|
| JP | 3-95811 | A | | 4/1991 |
| JP | 6-50551 | A | | 2/1994 |
| JP | 06124787 | A | * | 5/1994 |
| JP | 7-57585 | A | | 3/1995 |
| JP | 11-111429 | A | | 4/1999 |
| JP | 2002-177143 | A | | 6/2002 |
| JP | 2002177143 | A | * | 6/2002 |
| JP | 2003-109736 | A | | 4/2003 |
| JP | 2003-123954 | A | | 4/2003 |
| JP | 2003123954 | A | * | 4/2003 |
| JP | 2005-38739 | | | 2/2005 |
| JP | 2005-265212 | A | | 9/2005 |
| JP | 2005-268208 | A | | 9/2005 |
| JP | 2005265212 | A | * | 9/2005 |
| JP | 2009243771 | A | * | 10/2009 |

* cited by examiner

HEATING COOKER

This application is a U.S. National Phase Application of PCT International Application PCT/JP2006/320166.

TECHNICAL FIELD

The present invention relates to a heating cooker in which a load such as a pan is placed on a top panel and heated by a heater.

BACKGROUND ART

Japanese Patent Unexamined Publication No. 2005-38739 discloses a heating cooker including a touch operation part which has operation display parts to allow the user to control the heating of the heater for cooking.

In this conventional structure, the display to indicate to the user whether the operation display parts of the touch operation part are operable or not is controlled by turning the backlight on and off. However, the printed characters are recognizable even when the backlight is off, and this causes the user to mistakenly believe that the operation display parts of the touch operation part are operable and to become confused.

SUMMARY OF THE INVENTION

The heating cooker of the present invention includes a top panel for placing a load thereon; a heater for heating the load; and a touch operation part for operating heat operation of the heater. The touch operation part includes operation display parts having display characters under the top panel and a backlight for emitting light through the top panel so as to display the display characters in lighting. When not displayed, the operation display parts including the display characters are entirely unlit and are made inoperable.

Consequently, when the operation display parts are non-displayed, that is, when the touch operation part is inoperable, the operation display parts including the display characters are entirely unlit. This enables the user to recognize that the touch operation part is inoperable, making the heating cooker user-friendly.

REFERENCE MARKS IN THE DRAWINGS

Figure 1:
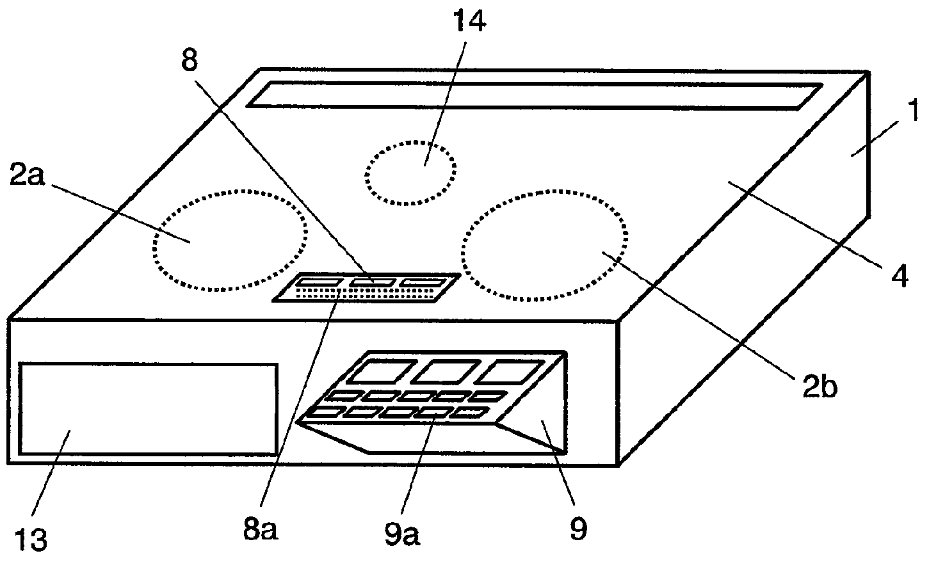
FIG. 1 is an external perspective view of a heating cooker according to first and second embodiments of the present invention.

1 outer shell
2*a*, 2*b* heating coil
3*a*, 3*b* heater
4 top panel
5*a*, 5*b* load
6*a*, 6*b* temperature detector
8, 9 touch operation part
8*a*, 9*a* operation display part
10 operating-part temperature detector
11 backlight
12 LCD
12*a* display character

DETAILED DESCRIPTION OF PREFERRED EMBODIMENTS

Embodiments of the present invention are described as follows with reference to drawings. Note that the present invention is not limited to these embodiments.

First Embodiment

Figure 2:
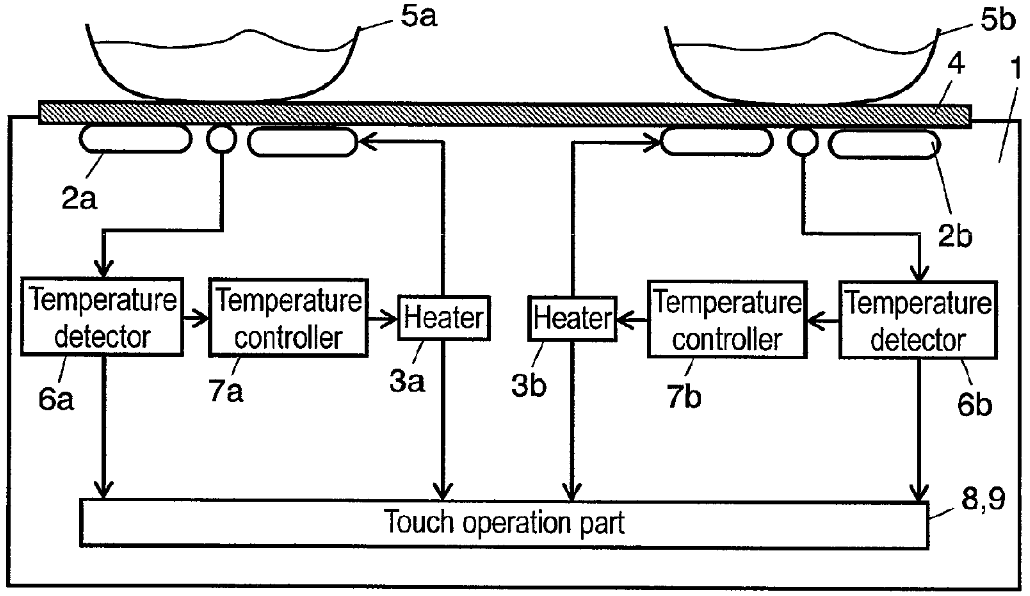
FIG. 2 is a block diagram showing the structure of a circuit in the heating cooker according to the first and second embodiments of the present invention.

FIG. 1 is an external perspective view of a heating cooker according to a first embodiment of the present invention, and FIG. 2 is a block diagram showing the structure of a circuit in the heating cooker according to the first embodiment of the present invention.

As shown in FIGS. 1 and 2, the heating cooker of the present first embodiment includes outer shell 1, top panel 4, heating coils 2*a* and 2*b* (shown in dotted lines in FIG. 1), heaters 3*a* and 3*b*, temperature detectors 6*a* and 6*b*, temperature controllers 7*a* and 7*b*, and touch operation parts 8 and 9. Outer shell 1 forms the main body of the heating cooker. Top panel 4 is made of ceramic and forms the top portion of outer shell 1 and places loads 5*a* and 5*b* such as pans thereon. Heating coils 2*a* and 2*b* are disposed on the left and right sides in the front of upper portion of the main body, and disposed at the bottom surface of top panel 4 so as to induction-heat loads 5*a* and 5*b*. Heaters 3*a* and 3*b* supply a high-frequency current to heating coils 2*a* and 2*b* for heat control. Temperature detectors 6*a* and 6*b* detect the temperatures of loads 5*a* and 5*b* via top panel 4. Temperature controllers 7*a* and 7*b* control the temperatures of loads 5*a* and 5*b* by controlling the heating of heaters 3*a* and 3*b* in accordance with the signals received from temperature detectors 6*a* and 6*b*. Touch operation parts 8 and 9 are operated by the user in order to heat heaters 3*a* and 3*b*. The heating cooker further includes roaster 13 disposed on the front of outer shell 1 and radiant heater 14 disposed in the middle of the back of upper portion of the main body, and disposed at the bottom surface of top panel 4.

Touch operation part 8 is disposed on the top surface of top panel 4, and touch operation part 9 is disposed on the top surface of an operating unit. The operating unit can be moved in and out of the front of outer shell 1 and has nearly the same functions as or some selected functions of touch operation part 8.

Figure 3:
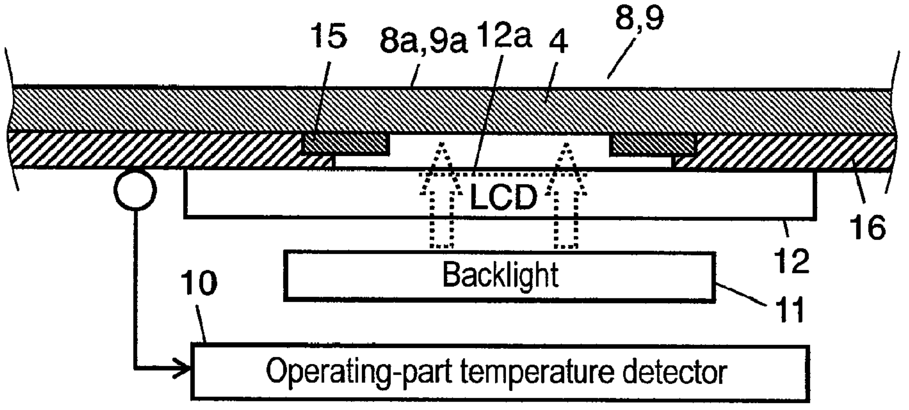
FIG. 3 is a sectional view showing a touch operation part of the heating cooker according to the first and second embodiments of the present invention.
Figure 4:
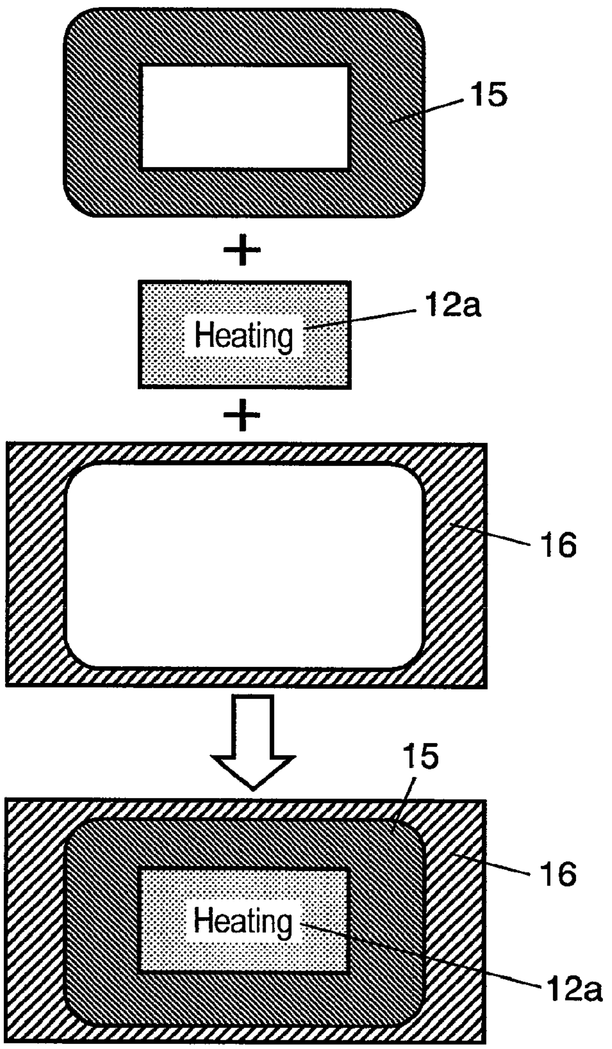
FIG. 4 is a diagram showing the structure of the touch operation part of the heating cooker according to the first and second embodiments of the present invention.

Touch operation part 8 is described in detail as follows. FIG. 3 is a sectional view showing a touch operation part of the heating cooker according to the first embodiment of the present invention. FIG. 4 is a diagram showing the structure of the touch operation part of the heating cooker according to the first embodiment of the present invention.

As shown in FIGS. 3 and 4, touch operation part 8 includes display parts 8*a* having part of top panel 4, electrode 15, mask printing part 16, and backlight 11. Electrode 15 is printed by applying electroconductive paint annularly on the bottom surface of top panel 4. Mask printing part 16 has the same color as the electroconductive paint and is disposed around electrode 15. LCD (Liquid Crystal Display) 12 is disposed under mask printing part 16. Backlight 11 illuminates LCD 12 through top panel 4 to make the user recognize display characters 12*a*. As shown in FIG. 3, touch operation part 8 further includes operating-part temperature detector 10 to detect its ambient temperature directly or indirectly.

LCD 12 has display characters 12*a* (including the word "heating" shown in FIG. 4) which are usually displayed as negative images so as to be shown in black when operation display parts 8*a* are non-displayed and to be shown in white characters on black background when operation display parts 8*a* are displayed. In FIG. 4, however, the word "heating" is shown normally for convenience. As in FIG. 3, when backlight 11 is on, the light emitted from backlight 11 passes through top panel 4 so that display characters 12*a* are displayed on operation display parts 8*a* of touch operation part 8.

Figure 5A:
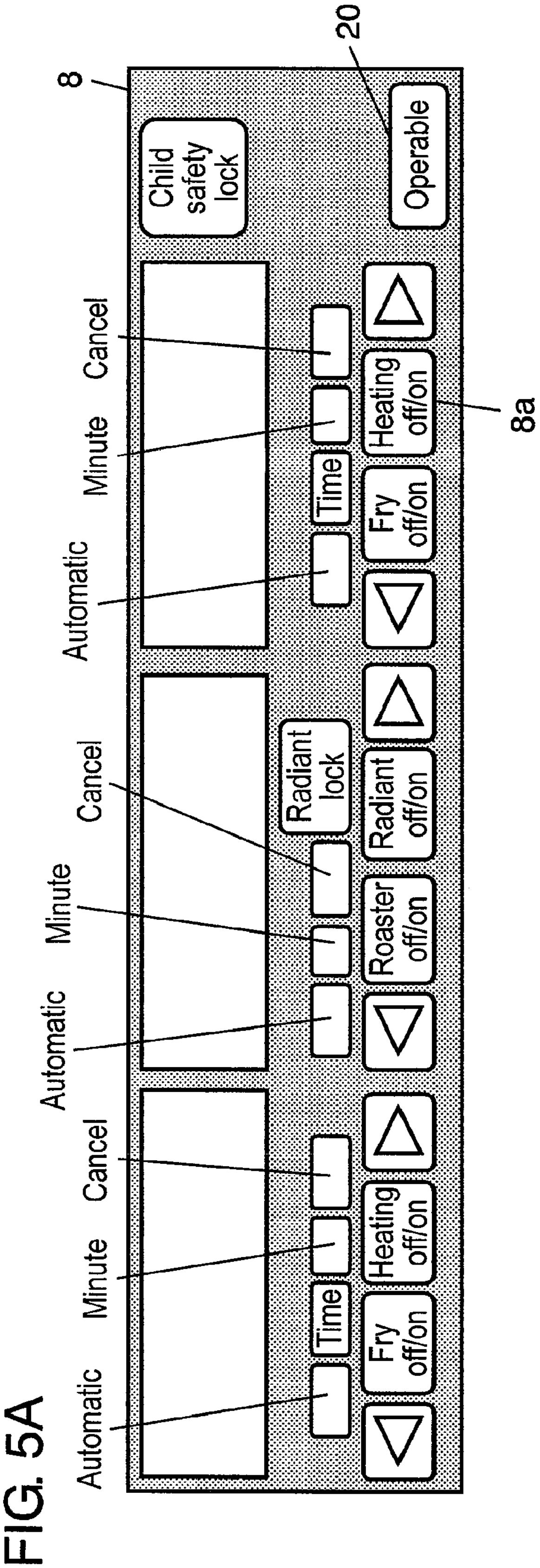
FIG. 5A is a plan view showing a state in which the touch operation part is entirely lit in the heating cooker according to the first and second embodiments of the present invention.
Figure 5B:
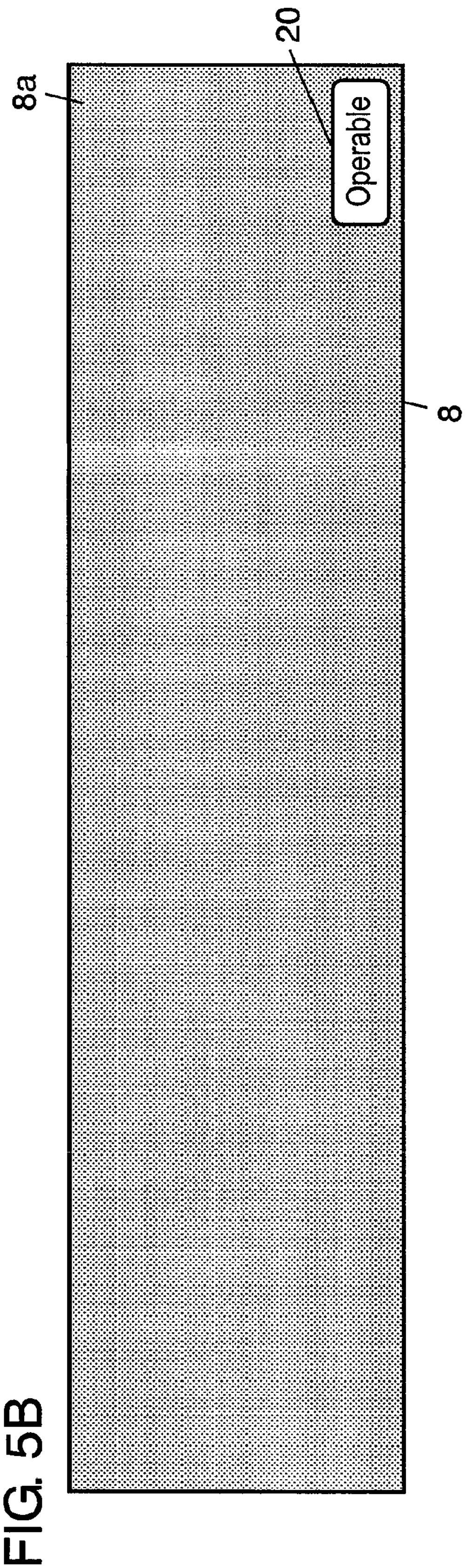
FIG. 5B is a plan view showing a state in which the touch operation part is entirely unlit in the heating cooker according to the first and second embodiments of the present invention.

When not displayed, operation display parts 8*a* are entirely unlit including display characters 12*a* to be shown in black and are made inoperable. More specifically, as shown in FIG. 5A, when backlight 11 is on, operation display parts 8*a* are entirely displayed including display characters 12*a*. In FIG. 5A, in the same manner as FIG. 4, display characters 8*a* are actually displayed as negative images so as to be shown in black when operation display parts 8*a* are non-displayed and to be shown in white characters on black background when operation display parts 8*a* are displayed, but are all shown normally in FIG. 5A for convenience. When not displayed, operation display parts 8*a* including display characters 12*a* are unlit and shown in black except for display switch 20 that reads "operable" as shown in FIG. 5B. At the same time, operation display parts 8*a* are also made inoperable except for display switch 20 that reads "operable". Note that display switch 20 that reads "operable" functions as a startup section to switch operation display part 8*a* of touch operation part 8 from the non-display state to the display state and also from the inoperable state to the operable state. Display switches of touch operation part 8 usually accept an input when the input continues for about 0.1 second; however, display switch 20 that reads "operable" accepts an input when it continues for about 0.3 seconds so as to avoid accepting accidental inputs. If operation display parts 9*a* of touch operation part 9 receive an input, touch operation part 9 can be used as the startup section instead of display switch 20 that reads "operable". In this case, after operation display parts 9*a* receive the input, the user can continue the input operation by using touch operation part 8 on top panel 4, which is easier to use than touch operation part 9.

Figure 6A:
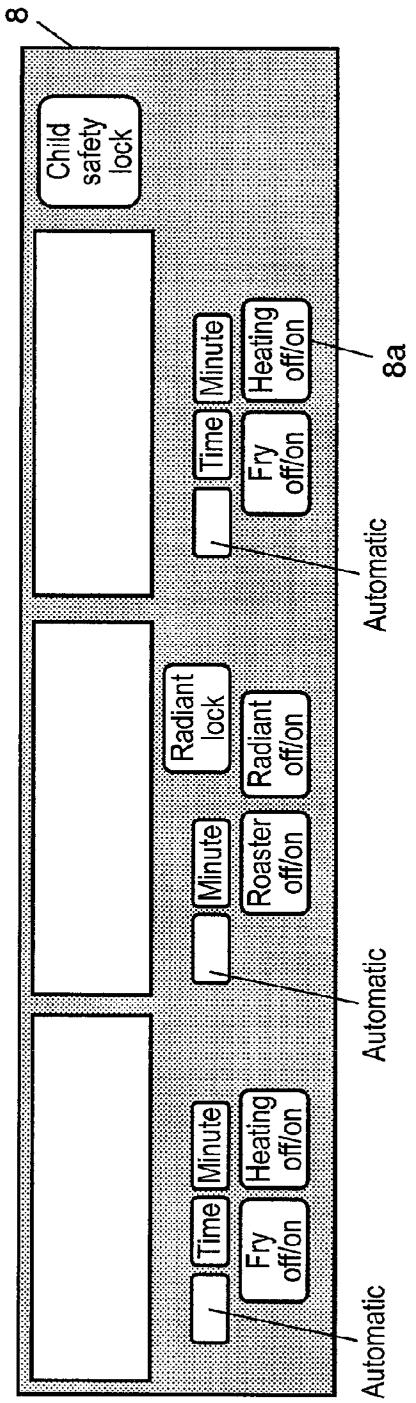
FIG. 6A is a plan view showing a state in which the power switch of the touch operation part is on in the heating cooker according to the first and second embodiments of the present invention.
Figure 6B:
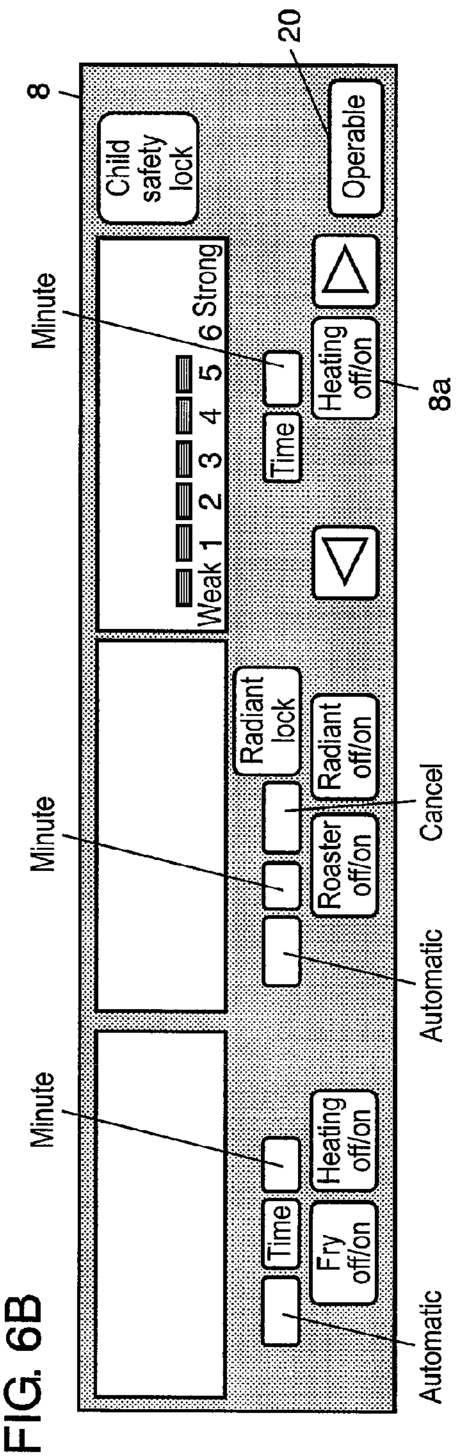
FIG. 6B is a plan view showing a usage state of the heating cooker according to the first and second embodiments of the present invention.

FIG. 6A shows the display contents of operation display parts 8*a* of touch operation part 8 when the user turns on the power. FIG. 6B shows the display contents of operation display parts 8*a* when the load is being heated. Thus, the display contents of operation display parts 8*a* of touch operation part 8 are different between when the user turns on the power and when the load is being heated. More specifically, operation display parts 8*a* display only the display switches that are operable at that moment, thereby preventing the user from selecting and pushing display switches that are inoperable at that moment.

Touch operation part 9 including operation display parts 9*a* has nearly the same structure as touch operation part 8 except that a glass operation panel in place of ceramic top panel 4 is disposed on the top surface of touch operation part 9.

In the present first embodiment, both touch operation parts 8 and 9 have the similar operation display parts; however, it is alternatively possible that only touch operation part 8 has the above-described structure as shown in FIGS. 5A, 5B, 6A, and 6B.

As described above, in the present first embodiment, when operation display parts 8*a* and 9*a* are in the display state, the user can control the operation of heaters 3*a*, 3*b*, and radiant heater 14 using operation display parts 8*a* and 9*a*. On the other hand, when operation display parts 8*a* and 9*a* are in the non-display state, that is, when operation display parts 8*a* and 9*a* are inoperable, operation display parts 8*a* and 9*a* are all unlit including the display characters. This enables the user to recognize whether operation display parts 8*a* and 9*a* are effective or ineffective at that moment, making the heating cooker user-friendly.

Display switch 20 that reads "operable" is provided as the startup section to switch operation display parts 8*a* and 9*a* of touch operation parts 8 and 9 from the non-display state to the display state and also to allow the user to switch operation display parts 8*a* and 9*a* from the inoperable state to the operable state. This allows the user to operate the startup section when necessary so as to immediately use operation display parts 8*a* and 9*a* of touch operation parts 8 and 9, making the heating cooker more user-friendly.

Touch operation part 8 is disposed on the top surface of top panel 4 and touch operation part 9 is disposed in a different position, that is, on the top surface of the operating unit, which can be moved in and out of the front of outer shell 1. Therefore, the user can operate touch operation part 9 as the startup section to control touch operation part 8. This allows the user to immediately use touch operation part 8, which is likely to cause malfunctions due to water or drips from the pans on top panel 4 by operating touch operation part 9, which is less likely to cause malfunctions because of being disposed in the operating unit which can be moved in and out of the front of outer shell 1. As a result, the heating cooker becomes safer and more user-friendly.

Operation display parts 8*a* and 9*a* of touch operation parts 8 and 9 display only the display switches that are operable at that moment. Therefore, the user can recognize which operation display parts 8*a* and 9*a* are operable at that moment. This prevents the user from erroneous operation, making the heating cooker more user-friendly.

Second Embodiment

A heating cooker according to a second embodiment of the present invention is described as follows. The same structural features of the heating cooker of the second embodiment as those of the heating cooker of the first embodiment are not described again. The following description is focused on the differences.

In the heating cooker of the present second embodiment, when touch operation parts 8 and 9 have not received inputs for a predetermined time period while heaters 3*a* and 3*b* are being heated, operation display parts 8*a* and 9*a* of touch operation parts 8 and 9 are made non-displayed and also are made inoperable. More specifically, if the user does not operate any display switch for, for example, ten minutes during the cooking, touch operation parts 8 and 9 are made inoperable and operation display parts 8*a* and 9*a* are non-displayed.

Consequently, when the user gets away from the device for a while, the operation of touch operation parts 8*a* and 9*a* becomes ineffective so as to prevent unexpected setting change. This makes the heating cooker safer.

In the present second embodiment, touch operation parts 8 and 9 have the similar operation display parts. Alternatively, however, it is possible that only touch operation part 8 which is likely to cause malfunctions has the operation display parts and that the operation of operation part 9 is not made ineffective. This structure enables the user to operate touch operation part 9 when the operation of touch operation part 8 becomes ineffective, thereby improving user-friendliness.

When temperature detectors 6*a* and 6*b* directly or indirectly detect that loads 5*a* and 5*b* heated by heaters 3*a* and 3*b* have a temperature equal to or more than a predetermined temperature, operation display parts 8*a* are made non-displayed and touch operation part 8 is made inoperable. More specifically, if loads 5*a* and 5*b* are heated without water, this fact is informed to the user. In addition, touch operation part 8 located near loads 5*a* and 5*b* is made to be non-displayed and inoperable so as to prevent the user from touching it. This is because heating loads 5*a* and 5*b* without water causes an increase in the ambient temperature of top panel 4 and hence the temperature of the vicinity of touch operation part 8. The temperatures of temperature detectors 6*a* and 6*b* at this moment are set, for example, to around 250° C., which is equal to or more than the upper limit of the temperature in normal use. The predetermined temperature can be set to any temperature.

This improves safety because when the load is at high temperatures, the user does not need to touch operation part 8. Alternatively, it is possible to provide a display indicating that the load is at high temperatures.

When operating-part temperature detector 10 directly or indirectly detects that touch operation part 8 has an ambient temperature equal to or more than a predetermined temperature, operation display parts 8*a* are made non-displayed and touch operation part 8 is made inoperable. More specifically, when the temperature detected by operating-part temperature detector 10 exceeds, for example, 50° C., operation display parts 8*a* of touch operation part 8 are non-displayed and do not accept inputs. The predetermined temperature can be set to any temperature.

This improves safety because when touch operation part 8 is at high temperatures, the user does not need to touch it. Alternatively, it is possible to provide a display indicating that touch operation part 8 is at high temperatures. It is also possible that when touch operation part 8 is in the inoperable state, only the specific display switches such as those for stopping heating are displayed on touch operation part 8 and made to be operable. This further improves safety.

Furthermore, the time required to switch operation display parts 8*a* and 9*a* of touch operation parts 8 and 9 from the display state to the non-display state is changed depending on the heating control of the heat output of heaters 3*a* and 3*b*. For example, when the heating power is set to 1000 W or more, the user is highly likely to change the heating power frequently. Therefore, when ten minutes have passed since the last time the user operated touch operation parts 8 and 9, touch operation parts 8 and 9 are made inoperable and operation display parts 8*a* and 9*a* are made non-displayed. On the other hand, when the heating power is set to less than 1000 W for, for example, simmered dishes, the heating power is required to be constant for a long time and the user is likely to leave the heating cooker for a while. Therefore, when three minutes have passed since the last time the user operated touch operation parts 8 and 9, touch operation parts 8 and 9 are made inoperable and operation display parts 8*a* and 9*a* are made non-displayed. The predetermined time period can be set to any time period.

Thus, the time period during which touch operation parts 8 and 9 are inoperable is set long when the heating power is high and the user is likely to stay close to the heating cooker and to frequently change the heating power. In contrast, the time period is set short when the heating power is low and the user is unlikely to leave the heating cooker and to change the heating power. As a result, the heating cooker becomes more user-friendly.

In addition, the predetermined time required to switch operation display parts 8*a* and 9*a* of touch operation parts 8 and 9 from the display state to the non-display state is changed depending on whether heaters 3*a* and 3*b* are operating or not. When only the power switch is turned on or when cooking is finished and no more heat is added, touch operation parts 8 and 9 are made inoperable in, for example, one minute, and operation display parts 8*a* and 9*a* are made to be non-displayed. The predetermined time period can be set to any time period.

This structure can change the time period of making touch operation parts 8 and 9 inoperable between the case where the user turns on the power but is not using the device and the case where the user is actually cooking using the device. The structure can also make touch operation parts 8 and 9 inoperable immediately when the user turns on the power but is not using the device and when the user stops using the device. As a result, the heating cooker becomes safe and user-friendly.

INDUSTRIAL APPLICABILITY

As described hereinbefore, the heating cooker of the present invention, which is user-friendly because the user can recognize when the touch operation part is inoperable, is applicable to all kinds of heating cookers having a touch operation part of capacitance or piezoelectric type.

The invention claimed is:

1. A heating cooker comprising:

a top panel for placing a load thereon;

a heater for heating the load; and a touch operation part of capacitance type on a top surface of the top panel including an operation display part;

the operation display part including:

an annular layer of electroconductive paint on a bottom surface of the top panel, the layer of electronconductive paint forming an electrode;

a mask printing part disposed around the electrode;

a display including a display character under an electrode center; and a backlight for emitting light from under the display character in lighting, the light passing through the electrode center which is not applied with the electroconductive paint and the top panel so as to display the display character thereby placing the operation display part in a display state, wherein the operation display part is switchable between:

a non-display state in which the operation display part including the display character is entirely unlit and is made inoperable, and a display state in which the heating of the heater can be controlled by the operation display part; wherein the operation display part is placed in a non-display state and is made inoperable when the touch operation part has not received an input within a predetermined period of time.

2. The heating cooker of claim 1, wherein the operation display part is configured to include:

a non-display state in which the operation display part including the display character is entirely unlit and the operation display part is made inoperable; and a display state in which the heating of the heater can be controlled by the operation display part, and wherein the touch operation part includes another operation display part as a startup section; and when the operation display part controlling the heating of the heater is entirely in the non-display state, only the startup section is set in the display state and the startup section is operated to switch the operation display part controlling the heating of the heater from the non-display state to the display state and also to a state capable of controlling the heating of the heater.

3. The heating cooker of claim 1, wherein the heating cooker includes another touch operation part only on a different surface from the top surface of the top panel, said different surface continuous with said top surface, and the touch operation part on the top surface of the top panel is controlled by operating the another touch operation part as a startup section so as to switch the operation display part from the non-display state to the display state and also to a state capable of controlling the heating of the heater.

4. The heating cooker of any one of claims 1, or 2, wherein in the touch operation part, only operation display parts, which can operate so as to control the heating of the heater, are set in the display state while the heater is operating.

5. The heating cooker of any one of claims 1, 2 or 3, wherein the display character is displayed as a negative image; and the operation display part becomes the display state when the display character is shown in a white character on black background by being exposed to the light of the backlight, and becomes the non-display state when the operation display part including the display character is shown in black.

* * * * *